United States Patent
Jeol et al.

(10) Patent No.: US 11,174,387 B2
(45) Date of Patent: Nov. 16, 2021

(54) USE OF POLYAMIDE 6 (PA6) AS A HEAT-AGING STABILIZER IN POLYMER COMPOSITIONS COMPRISING POLYPHENYLENE SULFIDE (PPS)

(71) Applicant: SOLVAY SPECIALTY POLYMERS USA, LLC, Alpharetta, GA (US)

(72) Inventors: Stéphane Jeol, Cumming, GA (US); Christopher Ward, Sandy Springs, GA (US); Vito Leo, Incourt (BE)

(73) Assignee: Solvay Specialty Polymers USA, LLC, Alpharetta, GA (US)

( * ) Notice: Subject to any disclaimer, the term of this patent is extended or adjusted under 35 U.S.C. 154(b) by 14 days.

(21) Appl. No.: 16/464,936

(22) PCT Filed: Dec. 1, 2017

(86) PCT No.: PCT/EP2017/081110
§ 371 (c)(1),
(2) Date: May 29, 2019

(87) PCT Pub. No.: WO2018/100128
PCT Pub. Date: Jun. 7, 2018

(65) Prior Publication Data
US 2019/0309165 A1  Oct. 10, 2019

Related U.S. Application Data

(60) Provisional application No. 62/429,222, filed on Dec. 2, 2016.

(30) Foreign Application Priority Data

Jan. 31, 2017  (EP) .................................... 17154024

(51) Int. Cl.
| | |
|---|---|
| *C08L 81/02* | (2006.01) |
| *C08K 5/00* | (2006.01) |
| *C08K 7/14* | (2006.01) |
| *C08L 77/02* | (2006.01) |
| *C08L 77/06* | (2006.01) |
| *C08L 77/10* | (2006.01) |
| *C08L 81/04* | (2006.01) |
| *C08K 13/06* | (2006.01) |
| *C08K 9/00* | (2006.01) |
| *C08J 3/22* | (2006.01) |

(52) U.S. Cl.
CPC ................. *C08L 81/02* (2013.01); *C08J 3/22* (2013.01); *C08K 5/00* (2013.01); *C08K 5/005* (2013.01); *C08K 7/14* (2013.01); *C08K 9/00* (2013.01); *C08K 13/06* (2013.01); *C08L 77/02* (2013.01); *C08L 77/06* (2013.01); *C08L 77/10* (2013.01); *C08L 81/04* (2013.01); *C08K 2201/019* (2013.01)

(58) Field of Classification Search
CPC .......... C08L 77/02; C08L 77/04; C08L 81/04
See application file for complete search history.

(56) References Cited

U.S. PATENT DOCUMENTS

| | | | |
|---|---|---|---|
| 5,759,925 A | 6/1998 | Ballard et al. | |
| 8,076,423 B2 | 12/2011 | Ishio et al. | |
| 2014/0256864 A1* | 9/2014 | Isago | ...................... B29B 7/845 524/400 |
| 2016/0168380 A1 | 6/2016 | Jeol et al. | |

FOREIGN PATENT DOCUMENTS

| | | |
|---|---|---|
| CN | 102876040 A | 1/2013 |
| CN | 103450672 A | 12/2013 |
| CN | 103525088 A | 1/2014 |
| CN | 103755881 A | 4/2014 |
| CN | 103756321 A | 4/2014 |
| CN | 104072991 A | 10/2014 |
| CN | 104231607 A | 12/2014 |
| CN | 104861655 A | 8/2015 |
| CN | 105062071 A | 11/2015 |
| EP | 443729 A2 | 8/1991 |
| EP | 473038 A1 | 3/1992 |
| EP | 0475038 B1 * | 10/1995 |
| JP | 2001329171 A | 11/2001 |
| KR | 100652968 B1 | 11/2006 |
| KR | 2012069798 A | 6/2012 |

OTHER PUBLICATIONS

Murphy J., in "Additives for Plastics Handbook", 2nd Edition, 2001, Chapter 5.2.3., p. 43-48—Elsevier Advanced Technology.
Tang W. et al., "Toughening and compatibilization of polyphenylene sulfide/nylon 66 blends with SEBS and maleic anhydride grafted SEBS triblock copolymers", Journal of Applied Polymer Science, 2007, vol. 106, pp. 2648-2655—Wiley Periodicals Inc.

* cited by examiner

*Primary Examiner* — Ana L. Woodward
(74) *Attorney, Agent, or Firm* — Osha Bergman Watanabe & Burton LLP

(57) ABSTRACT

The present invention relates to a polymer composition comprising polyphenylene sulphide (PPS), polyamide 6 (PA6), reinforcing agents, wherein the weight ratio of PPS/PA6 is at least 2, with the proviso that the composition does not comprise an elastomer or comprises an elastomer in an amount not exceeding 1 wt. %. The present invention also relates to articles incorporating the polymer composition and the use of polyamide 6 (PA6) as a heat-aging stabilizer in a polymer composition.

15 Claims, No Drawings

USE OF POLYAMIDE 6 (PA6) AS A HEAT-AGING STABILIZER IN POLYMER COMPOSITIONS COMPRISING POLYPHENYLENE SULFIDE (PPS)

RELATED PATENT APPLICATIONS

This application claims priority to U.S. 62/429,222 filed on Dec. 2, 2016 and to European patent application No. EP 17154024.8 filed on Jan. 31, 2017, the whole content of each of these applications being incorporated herein by reference for all purposes.

TECHNICAL FIELD

The present invention relates to a polymer composition comprising polyphenylene sulfide (PPS), polyamide 6 (PA6), reinforcing agents, wherein the weight ratio of PPS/PA6 is at least 2, with the proviso that the composition does not comprise an elastomer or comprise an elastomer in an amount not exceeding 1 wt. %. The present invention also relates to articles incorporating the polymer composition. These articles not only present good mechanical properties after fabrication, but also present a substantial retention of these mechanical properties after long term exposure to high temperature (i.e. long term high temperature stability or heat aging stability).

BACKGROUND ART

Polymer compositions are commonly used to manufacture articles for the automotive, electrical and electronic industries, for example as engine parts and electronic parts. Submitted to high temperatures for long period of times, these articles not only have to present good mechanical properties after fabrication, but also have to retain a sufficient percentage of these properties after exposure to long-term high temperature (i.e. heat aging stability). Polymer compositions to be used in these technology fields thus have to present a mechanical properties after fabrication, such properties depending on their specific use and location, for example as part of an engine or an electronic device.

US 2016/0168380 (Rhodia) relates to filled polyamide compositions comprising: a polyhydric alcohol-modified polyamide (A), comprising an amount of polyhydric alcohol (PHA, herein after) residues chemically bonded at least to a part of the polyamide of at least 0.1% wt (based on the total weight of polyamide (A)); at least one filler; and at least one polyamide, different from polyamide (A), more than 50% moles of recurring units thereof being of formula —HN—(CH$_2$)$_5$—CO— (polyamide (PA6)), in an amount of 5 to 50% wt, based on the combined weight of polyamide (A) and polyamide (PA6).

The applicant has identified new polymer compositions presenting improved initial stiffness and tensile strength, as well as heat aging stability. These compositions contain two chemically distinct polymeric components: a polyphenylene sulfide (PPS) and a polyamide 6 (PA6), and reinforcing agents (e.g. glass fibers or carbon fibers). The technical effects of the polymer composition make the articles made therefrom well suited for, e.g. the automotive, electrical or electronic industries.

DISCLOSURE OF THE INVENTION

The present invention relates to a polymer composition (C) comprising:
- a polyphenylene sulfide (PPS),
- 5 to 15 wt. % of polyamide 6 (PA6),
- 25 to 60 wt. % of reinforcing agents,
- 0 to 5 wt. % of an optional component selected from the group consisting of plasticizers, colorants, pigments, antistatic agents, dyes, lubricants, thermal stabilizers, light stabilizers, flame retardants, nucleating agents and antioxidants,
- wherein the weight ratio PPS/PA6 is at least 2, with the proviso that the composition either does not comprise an elastomer or comprises the same in an amount not exceeding 1 wt. %, wherein wt. % are based on the total weight of the composition.

The applicant has found that the composition of the present invention provides an effective, cost-effective solution to the above-stated technical constraints required by the automotive, electrical or electronic markets: stiffness, tensile strength and heat aging stability (e.g. after 500 hours or 1000 hours at 200° C.).

Polyphenylene Sulfide Polymer (PPS)

The polymer composition (C) comprises a polyphenylene sulfide polymer (PPS). The PPS is, according to the present invention, the polymeric component present in the higher amount in the composition (C).

According to the present invention, a "polyphenylene sulfide polymer (PPS)" denotes any polymer of which at least about 50 mol. % of the recurring units are recurring units (R$_{PPS}$) of formula (L) (mol. % are herein based on the total number of moles in the PPS polymer):

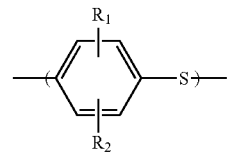

(R$_{PPS}$)

wherein R$_1$ and R$_2$, equal to or different from each other, are selected from the group consisting of hydrogen atoms, halogen atoms, C$_1$-C$_{12}$ alkyl groups, C$_7$-C$_{24}$ alkylaryl groups, C$_7$-C$_{24}$ aralkyl groups, C$_6$-C$_{24}$ arylene groups, C$_1$-C$_{12}$ alkoxy groups, and C$_6$-C$_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

According to an embodiment of the present invention, at least about 60 mol. %, at least about 70 mol. %, at least about 80 mol. %, at least about 90 mol. %, at least about 95 mol. %, at least about 99 mol. % of the recurring units in the PPS are recurring units (R$_{PPS}$) of formula (L).

The mol. % are based are based on the total number of moles in the PPS.

According to an embodiment of the present invention, the polyphenylene sulfide polymer denotes any polymer of which at least 50 mol. % of the recurring units are recurring units (R$_{PPS}$) of formula (L) wherein R$_1$ and R$_2$ are hydrogen atoms. For example, the PPS polymer is such that at least about 60 mol. %, at least about 70 mol. %, at least about 80 mol. %, at least about 90 mol. %, at least about 95 mol. %, at least about 99 mol. % of the recurring units in the PPS are recurring units (R$_{PPS}$) of formula (L) wherein R$_1$ and R$_2$ are hydrogen atoms.

According to an embodiment of the present invention, the PPS polymer is such that about 100 mol. % of the recurring units are recurring units ($R_{PPS}$) of formula (L):

($R_{PPS}$)

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains, or wherein $R_1$ and $R_2$ are hydrogen atoms.

According to this embodiment, the PPS polymer consists essentially of recurring units ($R_{PPS}$) of formula (L).

PPS is notably manufactured and sold under the trade name Ryton® PPS by Solvay Specialty Polymers USA, LLC.

According to the present invention, the weight average molecular weight of the PPS may be from 30,000 to 70,000 g/mol, for example from 35,000 to 60,000 g/mol. The weight average molecular weight can be determined by gel permeation chromatography (GPC) using ASTM D5296 with polystyrene standards.

According to an embodiment of the present invention, the polymer composition comprises at least 35 wt. % of PPS, based on the total weight of the polymer composition (C). For example, the polymer composition comprises at least 38 wt. % of PPS, at least 40 wt. % of PPS, at least 42 wt. % of PPS or at least 45 wt. % of PPS.

According to an embodiment of the present invention, the polymer composition comprises less than 70 wt. % of PPS, based on the total weight of the polymer composition (C). For example, the polymer composition comprises less than 68 wt. % of PPS, less than 66 wt. % of PPS, less than 64 wt. % of PPS or less than 62 wt. % of PPS.

According to an embodiment of the present invention, the polymer composition comprises from 35 to 70 wt. % of PPS, based on the total weight of the polymer composition (C). For example, the polymer composition comprises from 40 to 68 wt. % of PPS, from 42 to 66 wt. % of PPS, from 45 to 65 wt. % of PPS or from 48 to 64 wt. % of PPS.

Polyamide 6 (PA6)

The polymer composition (C) comprises a polyamide 6 (PA6).

A "polyamide 6 (PA6)" denotes any polymer of which at least about 50 mol. % of the recurring units are recurring units ($R_{PA6}$) of formula (N) (mol. % are herein based on the total number of moles in the PA6 polymer):

—NH—(CH$_2$)$_5$—CO—   (N)

According to one embodiment of the present invention, the polyamide PA6 is such that at least about 60 mol. %, at least about 70 mol. %, at least about 80 mol. %, at least about 90 mol. %, at least about 95 mol. %, at least about 99 mol. % of the recurring units ($R_{PA6}$) are of formula (N).

The mol. % are based are based on the total number of moles in the PA6.

According to one embodiment, recurring units ($R_{PA6}$) are obtained from lactam or aminoacids having the structure $NH_2$—$(CH_2)_5$—COOH.

The polyamide PA6 of the present invention may comprise recurring units different from recurring units ($R_{PA6}$). For example, it may comprise recurring units ($R_{PA*}$), resulting from the condensation product of:
   at least one diacid [acid (DA)] (or derivatives thereof), and
   at least one diamine [amine (NN)] (or derivatives thereof).

According to this embodiment, the diacid [acid (DA)] can be chosen among a large variety of aliphatic or aromatic components comprising at least two acidic moieties —COOH and can notably comprise heteroatoms (e.g. O, N or S). According to this embodiment, the diamine [amine (NN)] can be chosen among a large variety of aliphatic or aromatic components comprising at least two amine moieties —$NH_2$ and can notably comprise heteroatoms (e.g. O, N or S).

According to an embodiment of the present invention, the recurring units ($R_{PA*}$) are according to formula (E):

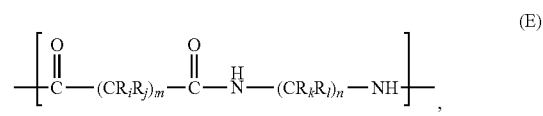

(E)

wherein:
   each $R_i$, $R_j$, $R_k$, and $R_l$ on each carbon atom is independently selected from a hydrogen, a halogen, an alkyl, an alkenyl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof;
   m is an integer from 0 to 10;
   n is an integer from 6 to 12.

According to another embodiment, the recurring units ($R_{PA*}$) result from the condensation of:
   at least one aliphatic diacid ($DA_{al}$) or derivative thereof (acid halogenides, especially chlorides, acid anhydrides, acid salts, acid amides), and
   at least one aromatic diamine ($NN_{ar}$) or derivative thereof.

According to another embodiment, the recurring units ($R_{PA*}$) result from the condensation of:
   at least an aromatic diacid ($DA_{ar}$), or derivative thereof or
       at least an aliphatic diamine ($NN_{al}$), or derivative thereof.

Non limitative examples of aromatic diamines ($NN_{ar}$) are notably m-phenylene diamine (MPD), p-phenylene diamine (PPD), 3,4'-diaminodiphenyl ether (3,4'-ODA), 4,4'-diaminodiphenyl ether (4,4'-ODA) p-xylylene diamine (PXDA) and m-xylylenediamine (MXDA).

Non limitative examples of aliphatic diacids ($DA_{al}$) are notably oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC—C$(CH_3)_2$—$(CH_2)_2$—COOH], adipic acid [HOOC—$(CH_2)_4$—COOH], 2,4,4-trimethyl-adipic acid [HOOC—CH$(CH_3)$—$CH_2$—C$(CH_3)_2$—$CH_2$—COOH], pimelic acid [HOOC—$(CH_2)_5$—COOH], suberic acid [HOOC—$(CH_2)_6$—COOH], azelaic acid [HOOC—

(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH] and tridecanedioic acid [HOOC—(CH$_2$)$_{11}$—COOH].

Non limitative examples of aliphatic diamines (NN$_{al}$) are notably 1,2-diaminoethane, 1,2-diaminopropane, propylene-1,3-diamine, 1,3-diaminobutane, 1,4-diaminobutane (putrescine), 1,5-diaminopentane (cadaverine), 2-methyl-1,5-diaminopentane, hexamethylenediamine, 3-methylhexamethylenediamine, 2,5 dimethylhexamethylenediamine, 2,2,4-trimethyl-hexamethylenediamine, 2,4,4-trimethyl-hexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane and N,N-Bis(3-aminopropyl)methylamine.

Non limitative examples of aromatic diacids (DA$_{ar}$) are notably phthalic acids, including isophthalic acid (IPA), terephthalic acid (TPA), naphthalendicarboxylic acids (e.g. naphthalene-2,6-dicarboxylic acid), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene.

According to the present invention, the weight average molecular weight of the PA6 may be from 5,000 to 50,000 g/mol, for example from 10,000 to 40,000 g/mol. The weight average molecular weight can be determined by gel permeation chromatography (GPC) using ASTM D5296 with polystyrene standards.

According to the present invention, the polymer composition comprises at least 5 wt. % of PA6, based on the total weight of the polymer composition (C). For example, the polymer composition comprises at least 5.5 wt. % of PA6, at least 6 wt. % of PA6, at least 6.5 wt. % of PA6 or at least 7 wt. % of PA6.

According to the present invention, the polymer composition comprises less than 15 wt. % of PA6, based on the total weight of the polymer composition (C). For example, the polymer composition comprises less than 14 wt. % of PA6, less than 12 wt. % of PA6, less than 11 wt. % of PA6 or less than 10 wt. % of PA6.

According to the present invention, the polymer composition comprises from 5 to 15 wt. % of PA6, based on the total weight of the polymer composition (C). For example, the polymer composition comprises from 5 to 14 wt. % of PA6, from 5.5 to 13 wt. % of PA6, from 6 to 12 wt. % of PA6 or from 6.5 to 11 wt. % of PA6.

Weight Ratio PPS/PA6

The polymer composition comprises both PPS and PA6 as above described in a weight ratio PPS/PA6 which is at least about 2. This means that the weight ratio PPS/PA6 can be equal to about 2 or can be greater than 2.

According to one embodiment of the present invention, the weight ratio PPS/PA6 is at least about 2.5. This means that the weight ratio PPS/PA6 can be equal to about 2.5 or can be greater than 2.5.

According to another embodiment of the present invention, the weight ratio PPS/PA6 is at least about 3. This means that the weight ratio PPS/PA6 can be equal to about 3 or can be greater than 3.

According to another embodiment of the present invention, the weight ratio PPS/PA6 is at least about 3.5. This means that the weight ratio PPS/PA6 can be equal to about 3.5 or can be greater than 3.5.

According to another embodiment of the present invention, the weight ratio PPS/PA6 is at least about 4. This means that the weight ratio PPS/PA6 can be equal to about 4 or can be greater than 4.

According to another embodiment of the present invention, the weight ratio PPS/PA6 is at least about 4.5. This means that the weight ratio PPS/PA6 can be equal to about 4.5 or can be greater than 4.5.

According to yet another embodiment of the present invention, the weight ratio PPS/PA6 is at least about 5. This means that the weight ratio PPS/PA6 can be equal to about 5 or can be greater than 5.

According to another embodiment of the present invention, the weight ratio PPS/PA6 is at least about 5.5. This means that the weight ratio PPS/PA6 can be equal to about 5.5 or can be greater than 5.5.

According to one embodiment of the present invention, the weight ratio PPS/PA6 is less than about 20. This means that the weight ratio PPS/PA6 can be equal to about 20 or can be less than 20. The weight ratio PPS/PA6 can for example be less than about 18, less than about 16 or less than about 14.

No Elastomer

The composition (C) of the present invention is characterized in that it does not comprise an elastomer or it comprises an elastomer in an amount not exceeding 1 wt. %, for example not exceeding 0.5 wt. %, not exceeding 0.1 wt. % or not exceeding 0.05 wt. %.

In the context of the present invention, an "elastomer" is defined as a polymeric material presenting a low glass transition temperature (T$_g$), that is to say a glass transition temperature below 25° C., below 0° C. or even below −25° C.

The applicant has surprisingly found that the addition of PA6 to PPS in a specific weight ratio, wherein the polymer composition does not comprise an elastomer or does not substantially comprise an elastomer, provides a polymer composition well suited for making articles that not only present a good initial stiffness and tensile strength, but also good performance in heat-aging stability (e.g. as measured on tensile strength at break according to ISO 527-2 after at least 500 hours at 200° C.). By avoiding the use of elastomer in the composition, the composition does not have to be made thicker to obtain the same performance and thus avoid the inevitable increase of weight which is not expected in e.g. the automotive, electrical or electronic industries.

For the sake of clarity, examples of elastomers which are, according to this embodiment, excluded from the polymer composition of the present invention are notably acrylonitrile-butadiene-styrene rubbers (ABS); block copolymers styrene ethylene butadiene styrene (SEBS); block copolymers styrene butadiene styrene (SBS); core-shell elastomers of methacrylate-butadiene-styrene (MBS) type; terpolymers of ethylene, acrylic ester and glycidyl methacrylate; copolymers of ethylene and butyl ester acrylate; copolymers of ethylene, butyl ester acrylate and glycidyl methacrylate; ethylene-maleic anhydride copolymers; EPR grafted with maleic anhydride; EPDM grafted with maleic anhydride (EPDM-g-MAH) or mixture of one or more of the above. Examples of commercially available elastomers are Exxelor® polymer resins (e.g. Exxelor® VA 1801) from Exxon Mobil and Lotader® polymer resins (Lotader® 8840) from Arkema.

Reinforcing Agents

The composition (C) also comprises 25 to 60 wt. % of reinforcing agents, based on the total weight of the composition (C).

The reinforcing agents, also called reinforcing fibers or fillers, may be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 25 wt. %, greater than 30 wt. % by weight, greater than 35 wt. % or greater than 40 wt. %, based on the total weight of the polymer composition (C). The reinforcing agents may be present in the composition (C) in a total amount of less than 65 wt. %, less than 60 wt. %, less than 55 wt. % or less than 50 wt. %, based on the total weight of the polymer composition (C).

The reinforcing filler may for example be present in the composition (C) in an amount ranging between 25 and 60 wt. %, for example between 30 and 50 wt. %, based on the total weight of the polymer composition (C).

Optional Components

The composition (C) may also comprises up to 5 wt. % of at least one optional component, for example selected from the group consisting of plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

According to an embodiment of the present invention, the composition (C) comprises 0.1 to 4 wt. %, 0.2 to 3 wt. %, 0.3 to 2.5 wt. % of at least one optional component selected from the group consisting of plasticizer, colorant, pigment, antistatic agent, dye, lubricant, thermal stabilizer, light stabilizer, flame retardant, nucleating agent and antioxidant.

The composition (C) may also comprise one or more other polymers. Mention can be made notably of polyaryletherketones or other polyamides (e.g. polyphthalamides).

Preparation of the Composition (C)

The invention further pertains to a method of making the composition (C) as above detailed, said method comprising melt-blending the polymers and the reinforcing agents, optionally any other components or additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Articles

The present invention also relates to the articles comprising the polymer composition (C) of the present invention, described above.

Examples of articles are films, laminates, automotive parts, engine parts, electrical parts and electronics parts.

According to the present invention, the articles manufactured from the polymer composition (C) of the present invention not only present good mechanical properties after fabrication, but also present a substantial retention of these mechanical properties after long term exposure to high temperature, for example after a 500-hour exposure at 200° C., a 1000-hour exposure at 200° C. or a 2000-hour exposure at 200° C.

The long-term heat stability of the articles can be assessed by exposure (air oven ageing) of test samples at test temperatures in an oven for test periods of time. The test samples are tested for tensile strength at break before and after air oven ageing. The comparison of the obtained values provides a percentage of retention of tensile strength at break and impact resistance, and thus the various compositions can be assessed as to long-term heat stability performance.

The retention of mechanical properties (%) after long term exposure to high temperature can be assessed by exposure of moulded test samples at a specific temperature (e.g. 200° C.) for a specific period of time (e.g. 500 hours, 1000 hours, 2000 hours or 3000 hours), the initial and final values being measured and compared according to the following equation:

$$100(MPf-MPi)/MPi$$

wherein:
MPf is the value of the mechanical property measured after long term exposure to high temperature and
MPi is the value of the mechanical property measured of the unexposed article.

For example, the retention of tensile strength at break (%) after long term exposure to high temperature is assessed according to the following equation:

$$100(TSi-TSf)/TSi$$

wherein:
TSf is the value of the tensile strength measured after long term exposure to high temperature and
TSi is the value of the tensile strength measured of the unexposed article.

The articles of the present invention may, for example, retain more than 50% of tensile strength at break (e.g. according to ISO 527-2) after a 500-hour or a 1000-hour exposure at 200° C. They may retain more than 60%, more than 70% or even more than 80% of tensile strength at break after a 500-hour or a 1000-hour exposure at 200° C.

The present invention also relates to a method for manufacturing an article by shaping the composition (C) of the invention. The article can be manufactured according to any shaping technique, such as for example extrusion, injection moulding, thermoform moulding, compression moulding, blow moulding or additive manufacturing like Fused Filament Fabrication (FFF) or Selective Laser Sintering (SLS). The article of the present invention is for example shaped by injection moulding.

Use of the Polymer Composition (C) and Articles

The polymer composition (C) of the present invention can be used to manufacture articles presenting a heat aging stability, in particular a substantial retention of mechanical properties after long term exposure to temperature of 200° C. Heat exposure of this kind can notably take place in automotive under-the-hood parts.

According to an embodiment of the present invention, the polymer composition (C) is used to manufacture articles in which:

$$100(TSi-TSf)/TSi \geq 50$$

wherein

TSf is the value of the tensile strength measured after long term exposure (e.g. 500 hours, 1000 hours, 2000 hours or 3000 hours) to high temperature (e.g. 200° C.) and TSi is the value of the tensile strength measured of the unexposed article.

According to another embodiment of the present invention, the polymer composition (C) is used to manufacture articles in which:

$$100(TSi-TSf)/TSi \geq 60,$$

$$100(TSi-TSf)/TSi \geq 70,$$

$$100(TSi-TSf)/TSi \geq 80, \text{ or}$$

$$100(TSi-TSf)/TSi \geq 85.$$

The composition (C), as disclosed above, is accordingly useful in increasing long-term thermal stability at high temperatures of articles made from the composition (C).

The present invention also relates to the use of the above disclosed composition (C) for high temperature applications.

Use of Polyamide 6 (PA6)

The present invention also relates to the use of polyamide 6 (PA6) as a heat-aging stabilizer in a polymer composition. In the context of the present invention, a "heat-aging stabilizer" can be defined as a component providing to the composition incorporating it the ability to retain at least 50% of the tensile strength at break (as measured according to ISO 527-2) after an exposure of at least 500 hours to a temperature of at least 200° C.

According to an embodiment of the present invention, the polyamide 6 (PA6), used as a heat-aging stabilizer, provides to the composition incorporating it the ability to retain at least 60% of the tensile strength at break, or at least 70%, at least 80% or at least 85% of the tensile strength at break (as measured according to ISO 527-2) after an exposure of at least 500 hours (or at least 1000 hours or at least 2000 hours) to a temperature of at least 200° C. (or at least 210° C. or at least 220° C.).

According to this aspect of the invention, the polyamide 6 (PA6) is as described above, notably in terms of composition, structure and content in the polymer composition (C).

According to an embodiment, the present invention also relates to the use of polyamide 6 (PA6) as a heat-aging stabilizer in a polymer composition comprising polyphenylene sulfide (PPS), for example comprising 35 to 70 wt. % of a polyphenylene sulfide (PPS) and 0 to 5 wt. % of an optional component selected from the group consisting of plasticizers, colorants, pigments, antistatic agents, dyes, lubricants, thermal stabilizers, light stabilizers, flame retardants, nucleating agents and antioxidants.

According to another embodiment, the present invention also relates to the use of polyamide 6 (PA6) as a heat-aging stabilizer in a polymer composition comprising polyphenylene sulfide (PPS) and reinforcing agents, for example comprising 35 to 70 wt. % of a polyphenylene sulfide (PPS) and 25 to 60 wt. % of reinforcing agents.

According to these embodiments, the PA6 may be present in the polymer composition in a ratio PPS/PA6 of at least 2, 2.5, 3, 3.5, 4, 4.5, 5 or 5.5.

The present invention also relates to a process for stabilizing heat-aging of a polymer composition, comprising adding an effective amount of polyamide 6 (PA6). In the context of the present invention, "stabilizing heat-aging" means retaining at least 50% of the tensile strength at break (or at least 60%, at least 70%, at least 80% or at least 85% of the tensile strength at break, as measured according to ISO 527-2) after an exposure of at least 500 hours (or at least 1000 hours or at least 2000 hours), to a temperature of at least 200° C. (or at least 210° C. or at least 220° C.).

According to this embodiment:
- the polymer composition may comprise polyphenylene sulfide (PPS), for example comprising 35 to 70 wt. % of a polyphenylene sulfide (PPS), and/or
- the polymer composition may comprise reinforcing agents, for example 25 to 60 wt. % of reinforcing agents, and/or
- the PA6 may be present in the polymer composition in a ratio PPS/PA6 of at least 2, 2.5, 3, 3.5, 4, 4.5, 5 or 5.5.

Should the disclosure of any patents, patent applications, and publications which are incorporated herein by reference conflict with the description of the present application to the extent that it may render a term unclear, the present description shall take precedence.

EXAMPLES

Raw Materials
PPS Ryton® QA281 N (Solvay)
PA 6 AK270 (Shaw Industries)
Glass Fibers T779H (Nippon)
Lotader@ AX8840 (Arkema), copolymer of ethylene and glycidyl methacrylate (epoxy functionalized)
Irganox® 1010 (BASF), an antioxidant
HDPE (High Density Polyethylene) 6007G (Chevron Phillips), a lubricant Compounding Compounding that involved the incorporation of glass fibers was performed on a Coperion ZSK-26 R&D twin-screw extruder (26 mm extruder). The neat PPS resin was fed into barrel 1. Glass fibers were fed at barrel 7. Optional ingredients when present were also included into barrel 1, possibly pre-mixed before being fed into barrel 1.

Barrel conditions were specified in order to achieve a melt temperature between 310° C. and 340° C. Screw speeds were set at 200 RPM. Feed rates were set according to the desired composition of each formulation.

The molten strands were cooled and crystallized in a water bath before being pelletized for further processing.

Molding

All compounds were molded into ISO Type IA tensile bars.

Testing

Tensile properties were tested according to ISO 527-2 using the ISO Type IA tensile bars.

Heat aging was performed by exposing test samples in an air oven regulated at 200° C. and removed after designated time intervals, to be subsequently tested at room temperature for tensile properties.

The components and their respective amounts in the compositions (according to the present invention or comparative) and the mechanical properties of the same are reported in Table 1 below.
Example

TABLE 1

|  | 1 | C1 | C2 |
|---|---|---|---|
| Components (wt. %) | | | |
| PPS | 59.25 | 69.25 | 63.25 |
| PA6 | 10 | — | — |
| Glass Fibers | 30 | 30 | 30 |
| Lotader ® AX8840 | — | — | 6 |
| HDPE 6007G | 0.25 | 0.25 | 0.25 |
| Irganox ® 1010 | 0.5 | 0.5 | 0.5 |
| Tensile properties and Heat aging Stability | | | |
| Tensile Modulus (MPa) | 11700 ± 173 | 12200 ± 164 | 10800 ± 311 |
| Tensile Strain at break (%) | 1.7 ± 0.05 | 1.4 ± 0.04 | 2.1 ± 0.06 |
| Tensile Stress at break (MPa) T0 | 163 ± 3.67 | 152 ± 2.85 | 164 ± 4.31 |
| Tensile stress at break (MPa) T1 = 1000 hours at 200° C. | 149 ± 2.35 | 131 ± 5.01 | 138 ± 2.73 |
| Heat aging-Tensile Strength at break Retention (%) | 91.4 | 86.2 | 84.1 |

The presence of PA6 in Example 1 results in a favourable balance of tensile properties (i.e. stiffness as measured by Tensile Modulus; Tensile Strain at break; and tensile strength as measured by Tensile Stress at break at T0) in comparison to the same composition incorporating no PA6 (comparative example C1) or the same composition incorporating no elastomer (comparative example C2).

Example 1, according to the invention, provides better heat aging stability (i.e. tensile strength retention of 91.4% as measured with tensile strength after 1000 hours at 200° C.), as compared to comparative examples C1 and C2.

Due to a higher value of heat aging resistance, Example 1 exhibits an even higher tensile stress value after heat aging (Tensile Stress at break at T1) than compared to comparative examples C1 and C2.

The invention claimed is:
1. A polymer composition comprising:
35 to 70 wt. % of a polyphenylene sulfide (PPS), wherein the polyphenylene sulfide (PPS) has a weight average molecular weight of 30,000 to 70,000 g/mol,
5 to 14 wt. % of polyamide 6 (PA6),
25 to 60 wt. % of reinforcing agents,
0 to 5 wt. % of an optional component selected from the group consisting of plasticizers, colorants, pigments, antistatic agents, dyes, lubricants, thermal stabilizers, light stabilizers, flame retardants, nucleating agents and antioxidants,
wherein the weight ratio PPS/PA6 is at least 2.5 and not more than about 14,
with the proviso that the composition does not comprise an elastomer or comprises an elastomer in an amount not exceeding 1 wt. %,
wherein wt. % are based on the total weight of the composition.
2. The polymer composition of claim 1, wherein the PPS comprises at least about 50 mol. % of recurring units ($R_{PPS}$) of formula (L):

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups,
wherein mol. % is based on the total number of moles in the PPS.
3. The polymer composition of claim 1, wherein the PA6 comprises at least about 50 mol. % of recurring units ($R_{PA6}$) of formula (N):
wherein mol. % is based on the total number of moles in the PA6.
4. The polymer composition of claim 1, wherein the weight ratio of PPS/PA6 is at least 3.
5. A method of making the polymer composition of claim 1, wherein the method comprises melt-blending PPS, PA6, and the reinforcing agents, and optionally any other components.
6. An article comprising the polymer composition of claim 1.
7. The article of claim 6, wherein the article is a film, a laminate, an automotive part, an engine part, an electrical part, or an electronic part.
8. A method of heat-stabilizing a polymer composition comprising;
adding from 5 to 14 wt. % of polyamide 6 (PA6) as a heat-aging stabilizer in the polymer composition comprising:
35 to 70 wt. % of a polyphenylene sulfide (PPS), wherein the polyphenylene sulfide (PPS) has a weight average molecular weight of 30,000 to 70,000 g/mol,
25 to 60 wt. % of reinforcing agents,
0 to 5 wt. % of an optional component selected from the group consisting of plasticizers, colorants, pigments, antistatic agents, dyes, lubricants, thermal stabilizers, light stabilizers, flame retardants, nucleating agents and antioxidants,
wherein the weight ratio PPS/PA6 is at least 2.5 and not more than about 14,
with the proviso that the composition either does not comprise an elastomer orcomprises an elastomer in an amount not exceeding 1 wt. %,
wherein wt. % are based on the total weight of the composition.
9. The method of claim 8, wherein the PA6 comprises at least about 50 mol. % of recurring units ($R_{PA6}$) of formula (N):

—NH—(CH$_2$)$_5$—CO—
wherein mol. % is based on the total number of moles in the PA6.

10. The method of claim 8, wherein the weight ratio of PPS/PA6 is at least 3.

11. The polymer composition of claim 1, wherein the weight ratio of PPS/PA6 is at least 4.

12. The polymer composition of claim 1, wherein the weight ratio of PPS/PA6 is at least 5.

13. The method of claim 8, wherein the weight ratio of PPS/PA6 is at least 4.

14. The method of claim 8, wherein the weight ratio of PPS/PA6 is at least 5.

15. A polymer composition consisting of:
35 to 70 wt. % of a polyphenylene sulfide (PPS),
5 to 14 wt. % of polyamide 6 (PA6),
25 to 60 wt. % of reinforcing agents,
0 to 5 wt. % of an optional component selected from the group consisting of plasticizers, colorants, pigments, antistatic agents, dyes, lubricants, thermal stabilizers, light stabilizers, flame retardants, nucleating agents and antioxidants,
wherein the weight ratio PPS/PA6 is at least 2.5 and not more than about 14, with the proviso that the composition does not comprise an elastomer or comprises an elastomer in an amount not exceeding 1 wt. %,
wherein wt. % are based on the total weight of the composition.

* * * * *